United States Patent [19]
Edvardsson

[11] Patent Number: 5,614,831
[45] Date of Patent: Mar. 25, 1997

[54] METHOD AND APPARATUS FOR LEVEL GAUGING USING RADAR IN FLOATING ROOF TANKS

[75] Inventor: Kurt O. Edvardsson, Linkoping, Sweden

[73] Assignee: Saab Marine Electronics Ab, Goteborg, Sweden

[21] Appl. No.: 387,410

[22] Filed: Feb. 13, 1995

[51] Int. Cl.⁶ .......................... G01R 27/02; G01S 13/08
[52] U.S. Cl. .......................... 324/642; 343/772; 342/142; 73/290 V
[58] Field of Search ................... 324/639, 642; 342/124; 73/290 R, 290 V; 343/772

[56] References Cited

U.S. PATENT DOCUMENTS

| | | |
|---|---|---|
| 4,044,355 | 8/1977 | Edvardsson .................... 73/290 V |
| 4,359,902 | 11/1982 | Lawless . |
| 4,641,139 | 2/1987 | Edvardsson . |
| 4,665,403 | 5/1987 | Edvardsson . |
| 4,670,754 | 6/1987 | Zacchio ............................ 342/124 |
| 5,070,730 | 12/1991 | Edvardsson ...................... 73/290 V |
| 5,136,299 | 8/1992 | Edvardsson . |
| 5,182,565 | 1/1993 | Nagamune ........................ 342/124 |
| 5,365,178 | 11/1994 | Van Der Pol ..................... 342/124 |
| 5,438,867 | 8/1995 | Van Der Pol ..................... 73/290 V |

FOREIGN PATENT DOCUMENTS

WO93/01474  1/1993  WIPO .

Primary Examiner—Maura K. Regan
Attorney, Agent, or Firm—Lowe, Price, LeBlanc & Becker

[57] ABSTRACT

A device for gauging the level of a fluid in a container includes a floating roof, a transmitter for feeding a first microwave signal downwards in the direction of a fluid surface of the fluid, and a receiver for receiving a reflected microwave signal. The device includes a collector located above and in the vicinity of the floating roof, collecting the first microwave signal producing a collected microwave signal. The device also includes a vertical wave guide passing through the floating roof. The vertical wave guide guides the collected microwave signal to the fluid surface, and receives a reflected microwave signal reflected from the fluid surface. The vertical wave guide then guides the reflected microwave signal back to the collector and further to the receiver. It is a special feature to permit accurate measurement of the level of the fluid surface without having direct access to the surface.

23 Claims, 4 Drawing Sheets

METHOD AND APPARATUS FOR LEVEL GAUGING USING RADAR IN FLOATING ROOF TANKS

BACKGROUND OF THE INVENTION

1. Field of the Invention

The present invention generally relates to the measurement of the level of fluids such as oil, in certain types of tanks in refineries and oil terminals. The present invention is more particularly related to the use of radar for the measurement of the level of the fluid in tanks which until now have been impossible to measure directly with radar.

The tanks under consideration are fitted with floating roofs, but in contrast to many other such tanks, constructed without any fluid or oil surface accessible for radar level gauging. The reason why no fluid or oil surface is available for radar level gauging may be a result of government environmental requirements (e.g., to avoid the leakage of hydrocarbon vapor). This is particularly true over the past decade where environmental requirements have become more important and more regulatory demanding. Alternatively, the floating roof tank may not be fitted with a still pipe which is generally used for level gauging.

2. Background of the Related Art

Level gauging devices have become more and more important particularly for petroleum products such as crude oil and products manufactured therefrom which are stored in containers or tanks. By containers it is meant in this context large containers constituting parts of the total loading volume of a tanker, or even larger usually circular-cylindrical land-based tanks with volumes of tens of thousands of cubic meters.

A typical tank is 20 m high and 40 m in diameter making a volume of 25000 cubic meters. Floating roof tanks are generally bigger than fixed roof tanks. With 100 tanks at one location, the demand for automatically reading the level of fluid in the tank is particularly important considering that the 100 tanks must be dispersed over an area of one square mile. Accuracy of measurement of the fluid level is very important since a few milimeters in the fluid level in the tank is generally worth more than the level gauging equipment itself. As a result, high demands are placed on the gauging equipment which are used to determine the fluid level in the containers.

Radar has been used for level gauging during the last 20 years (see U.S. Pat. Nos. 4,044,355 and 4,665,403 and many others) and has been generally used on refinery tanks or containers for noncontact measurements of the fluid level contained therein with high accuracy. The classical application is in a big tank with fixed roof where the radar beam passes through the entire empty space of the container which is unoccupied by the oil down to the oil surface or some other liquid surface.

Since the velocity of radar waves transmitted through air or other gases is generally stable, accurate measurements of the fluid level may generally be obtained. In addition, level measurements can be employed under adverse conditions resulting from extreme temperatures, chemical corrosion and mechanical stress because the radar antenna can be made of very durable material. Further, since the radar antenna can be mounted in a hole in the top of the container or tank, its installation becomes simple. Maintenance and eventual replacement of the radar antenna is also relatively simple due to its accessible location on the top of the tank.

Another common application of radar level gauging applies to an oil tank with a floating roof where no substantial empty space occurs for the radar beam to measure the oil beneath the floating roof. The roof floats on the oil like a raft with a sliding seal against the tank walls, preventing the oil and associated gases from escaping. Due to wind pressure and friction, the position of the roof itself is a poor measure of the position of the oil surface if an accurate measurement of 1–2 mm is required. Thus, level gaging utilizing the position of the roof has not been traditionally used for accurate level gauging.

Most tanks with floating roofs are therefore fitted with a standard still pipe which is slotted passing through a hole in the roof to get a place to measure the level. The still pipe requires a large diameter of 6"–20" and has holes or slots therein to guarantee the same oil level inside the pipe as outside. Level gauging can generally be performed using the still pipe which may also be used for taking samples for laboratory tests. One of the classical uses for this pipe is to protect a mechanical float gauge.

One method of level measuring which has been employed is to guide the radar waves in a wave guide that extends downward through the tank. Generally, a narrow diameter of the wave guide is required to properly transmit the radar signal from the top of the tank through the entire length of the wave guide. Level measuring according to this method has heretofore been tried, but serious practical limitations relating to the required small diameter of the wave guide to be suitable for the radar frequency range have been experienced. The wave guides that are referred to have comprised rectangular or circular cylindrical pipes of metal with dimensions that allow one-mode propagation. See, for example, U.S. Pat. No. 4,359,902, incorporated herein by reference.

The narrow diameter wave guide generally presents the following problems: First, if the crude oil is rich in wax, the pipe becomes easily clogged. Second, the propagation of the radar waves is unacceptably influenced by the hole in the tubular wave guide that is needed for assuring free flow of liquid between the fluid contained in the tank and the fluid contained inside of the wave guide. Third, corrosion in the pipe causes unacceptable damping in transmission from the top of the tank to the bottom for standard tank heights. It therefore becomes necessary to make the pipe of expensive material or to coat its inside with noble metal to prevent such corrosion.

U.S. Pat. No. 4,641,139 (hereinafter '139 patent), incorporated herein by reference, attempts to overcome the requirement of a narrow wave guide by employing a powerfully over-dimensioned wave guide to which radar radiation is so conducted that all undesired wave guide modes are suppressed. The wave guide in the '139 patent, in the majority of practical cases, preferably consists of an existing pipe in the cistern or tank, requiring the radar level gauge to tolerate substantial variations of the dimensions of the wave guide pipe, depending on the size of the existing pipe in the tank.

However, in the last few years, the use of these slotted still pipes has been reconsidered or reevaluated in some areas (e.g., the states of Texas and California in the United States) because the still pipes are considered to leak too much hydrocarbon vapor. The still pipes may, for that reason, be sealed in accordance with governmental regulations, and thus, are impossible to be used in level gauging. Further, it has been discovered that since these still pipes are required to extend the entire height of the tank, the still pipes are susceptible to adverse conditions in the tank and may not always provide the best medium for transmitting the radar waves from the top of the tank to the floating roof.

Accordingly, it is desirable to measure the level of a fluid in a tank without the general problems experienced by previous systems and methods. It is also desirable to measure the level of a fluid in a tank without the constraints of a still pipe which may leak hydrocarbon vapor. It is further desirable to measure the level of a fluid in a tank without the problems associated with a still pipe which extends along the height of the tank.

SUMMARY OF THE INVENTION

It is a feature and advantage of the present invention to measure the level of a fluid in a tank without the general problems experienced by previous systems and methods.

It is another feature and advantage of the present invention to measure the level of a fluid in a tank without the constraints of a still pipe which may leak hydrocarbon vapor.

It is another feature and advantage of the present invention to measure the level of a fluid in a tank without the problems associated with a still pipe which extends along the height of the tank.

As an integral part of the present invention, it has been discovered that transmission problems may arise when a pipe, extending through the container, is employed as a wave guide. In addition, it has been discovered that tanks or cisterns on land which comprise the so-called floating roofs already include holes which would make he fluid level accessible for measurement. Accordingly, it is another feature and advantage of the present invention to have a simple installation of radar apparatus that does not make necessary extensive and expensive remodeling of the tank or the cistern, including the floating roof.

The present invention is a method to measure the position of the oil surface directly while maintaining the sealing of the roof, but without use of the still pipe. In addition, the present invention measures the position of the oil surface regardless of whether the still pipe is present and sealed in accordance with government regulations. The measurement utilizes existing small holes in the floating roof (4"–6") which are normally used for mounting supporting legs (of which dozens exist on each roof to prevent the roof from creating damage on pipes etc. on the tank bottom) through the roof to support the roof in its lowest position within the tank. The present invention may utilize commonly known wave guide and antenna components and also polarization techniques as described in copending the U.S. patent application Ser. No. 08/170,305, filed on Mar. 2, 1994, and assigned to the assignee of the present application, and U.S. Pat. No. 5,136,299, both of which are incorporated herein by reference.

The invention provides a method to concentrate the main part of the energy in the radar beam through such a small hole in the floating roof, enabling the echo from the oil surface itself to be measured. The present invention also includes a method to suppress the undesired echo from the roof itself or from the tank wall, thereby improving the quality of the echo from the oil surface. An additional feature of the present invention is a way to measure the true oil surface all the way down to the bottom of the tank in spite of the free or empty space between the floating roof and the oil surface when the floating roof stands on its legs for very low oil levels in the tank such as 1–2 meters.

To accomplish the above features and advantages, a device for gauging the level of a fluid in a container with a floating roof is provided. The device includes a transmitter for feeding a first microwave signal downwards in the direction of a fluid surface of the fluid, and a receiver for receiving a reflected microwave signal. The device also includes a collector located above and in the vicinity of the floating roof, collecting the first microwave signal producing a collected microwave signal. The device further includes a vertical wave guide passing through the floating roof. The vertical wave guide guides the collected microwave signal to the fluid surface, and receives a reflected microwave signal reflected from the fluid surface. The vertical wave guide then guides the reflected microwave signal back to the collector and further to the receiver.

In addition, a method of measuring a fluid level of fluid in a container is provided. The container has an upper surface and a floating roof floating on the fluid. The method includes the steps of transmitting a signal downwards toward the fluid from a position near the upper surface of the container, collecting the signal at a location near the floating roof and producing a collected signal, and guiding the collected signal to the fluid via a vertical wave guide passing through the floating roof. The method also includes the steps of receiving a reflected signal responsive to the collected signal reflecting off of the fluid, transmitting the reflected signal from the location near the floating roof to the upper surface of the container, and receiving the reflected signal representing the fluid level of the fluid in the container at the upper surface.

These together with other objects and advantages which will be subsequently apparent, reside in the details of construction and operation as more fully herein described and claimed, with reference being had to the accompanying drawings forming a part hereof wherein like numerals refer to like elements throughout.

DETAILED DESCRIPTION OF THE PREFERRED EMBODIMENTS

Figure 1:
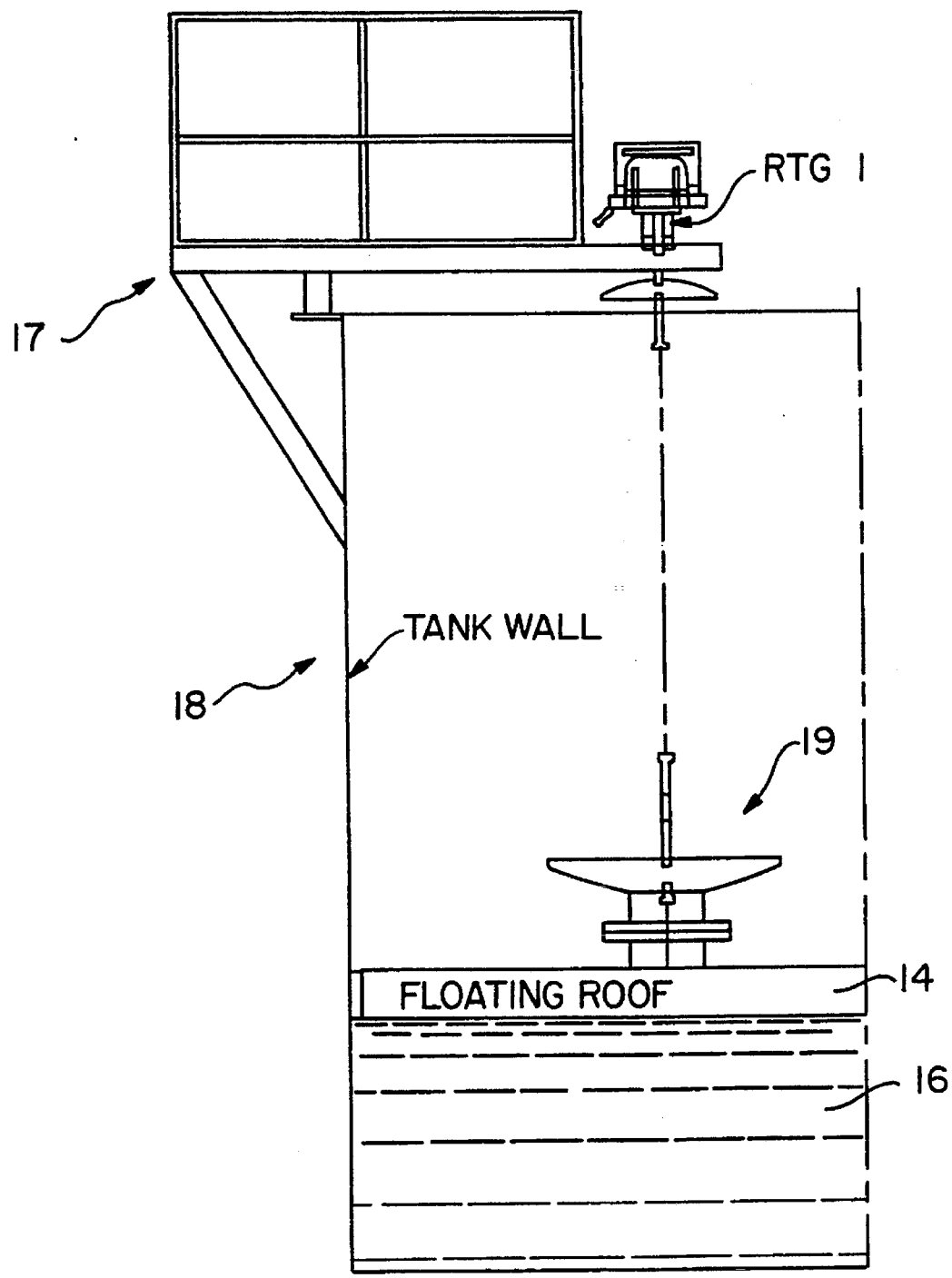
FIG. 1 is an illustration of the basic structure of the level gauging system using radar in floating roof tanks.

The mechanical construction of the level gauging system using radar in floating roof tanks generally comprises the following parts or components:

A. A radar level gauge or Radar Tank Gauge (RTG) with a vertical radar or microwave beam pointing down towards the floating roof from the upper part of the tank wall or ceiling. The RTG is permanently mounted above the highest position of the floating roof.

B. A collecting means (typically a parabolic reflector pointing upwards) in which the radar or microwave beam emitted from the RTG is collected and fed into a wave guide with its end fitted to a feeder structure substantially in the center of the parabolic reflector.

C. A continuation of the wave guide down into the fluid or oil, possibly with a change in diameter of the wave guide to a pipe passing through hole (preferably preexisting) in the floating roof. The end of the pipe should close over or extend to the bottom of the tank when the roof is in its lowest position. The continuation of the pipe below the floating roof will allow for measurements of the oil level when the oil is lower than the floating roof and when the floating roof stands on or is supported by its legs.

D. A vapor sealing in the pipe which is permeable with respect to the microwaves. The vapor sealing has no influence on the radar function but is generally important to prevent the undesired leakage of hydrocarbon vapors. A vapor sealing around the pipe may also be required.

E. An optional polarization means in the wave guide which will provide a more isolated or focused radar transmission/reception. The polarizer creates a distinction between the echo in the wave guide and the echo from the floating roof as well as corner echoes from the tank wall/floating roof area. In case the optional polarization is used, the RTG transmits in one linear polarization position or plane, and receives in a perpendicular linear polarization position. To avoid undesired influence from the corner echo generated by the tank wall/floating roof juncture, the polarized transmission should be perpendicular or parallel to the tank wall. See, for example, U.S. application Ser. No. 08/170,305, already incorporated herein by reference.

The basic requirement to get a good accuracy for the radar level gauging is that the echo from the fluid surface must be sufficiently stronger than the other echoes received by the RTG. In this case, the floating roof itself creates a substantial echo which has to be suppressed to a level clearly lower than the echo generated from the fluid surface. Also a double reflection (corner echo) from the tank wall and floating roof must be suppressed which may also be disturbing depending on the geometry of the tank. It is a specific feature of the present invention to accomplish the required suppression possible in spite of the fact that the reflection from the oil has an amplitude which is typically 5 times lower than that from steel floating roof of the same geometry.

The method and system to collect and suppress these echoes are illustrated by FIGS. 1–6 and the subsequent description.

In FIG. 1, the basic structure of the level gauging system using radar in floating roof tanks is described. RTG 1 is mounted to platform 17 of tank 18. RTG 1 transmits a radar signal to a corresponding radar transmitter/receiver 19 mounted to floating roof 14 which floats above fluid 16. Transmitter/receiver 19 receives the radar signal generated by RTG 1 and focuses the radar signal to be applied to fluid 16. The echo or reflected wave from the fluid is then transmitted back to RTG 1 via transmitter/receiver 19.

Figure 2:
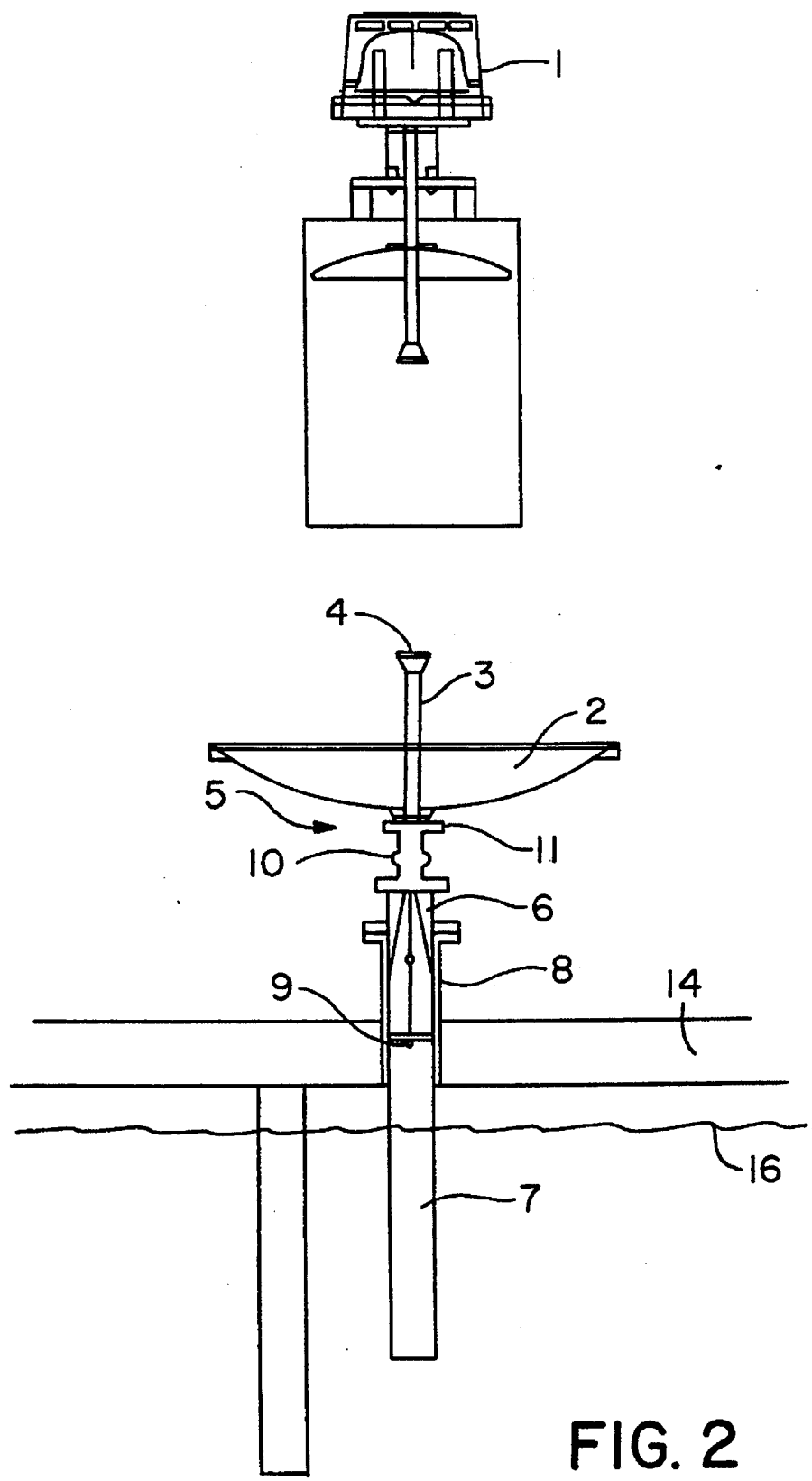
FIG. 2 is an illustration of the level gauging system using radar in floating roof tanks.

In FIG. 2, a parabolic reflector 2 collects the radar beam from the RTG 1 into the center 3 of the parabolic reflector 2. The parabolic reflector 2 is so big that essentially the same power is reflected from it as had been reflected from an "infinite" flat surface made of the same material. A suitable diameter of the parabolic reflector 2 to achieve this is the square root of the product of the maximum distance to the floating roof and the wavelength of the radar beam. With a frequency of 10 GHz and a 20 m deep tank that means typically a parabola with 0.8 m diameter.

The feeder 4 of the parabola 2 is connected to wave guide 5 directing the radiation energy downwards toward the bottom of the tank. Wave guide 5 is connected to a funnel 6 enlarging the diameter to a suitable diameter in the order of 3" to 6" where the diameter of the pipe 7 is suited to fit into the existing holes 8 of floating roof 14. Wave guide 5 includes vapor sealing 11 which may be accomplished using a membrane of a standard polymer. An important option, described above, is the use of polarization means 10 in wave guide 5. Polarizing means 10 preferentially comprises a dielectric plate placed with its axis coaxial with the axis of wave guide 5.

Other methods than funnel 6 are possible to change the wave guide diameter. A metallic funnel is well adapted or suited to the very dirty environment in this area of the tank. Pipe 7 is extended with regard to the conditions of the tank to end just over the tank bottom 15 when the floating roof 14 is in its lowest position. Pipe 7 includes holes 9 to stabilize or equalize the level of the fluid inside pipe 7 with the level of the fluid outside pipe 7 so that the true or accurate liquid level 16 is measured in pipe 7. Generally, the diameter of pipe 7 is in the range of 3" to 6" in order to be less sensitive to dirt. Cleaner oils may permit a smaller pipe to be used and eventually to avoid the funnel. The radar wave passing through the pipe 7 is reflected by the fluid surface 16 back up to the RTG 1 in the reverse direction or manner.

Figure 3:
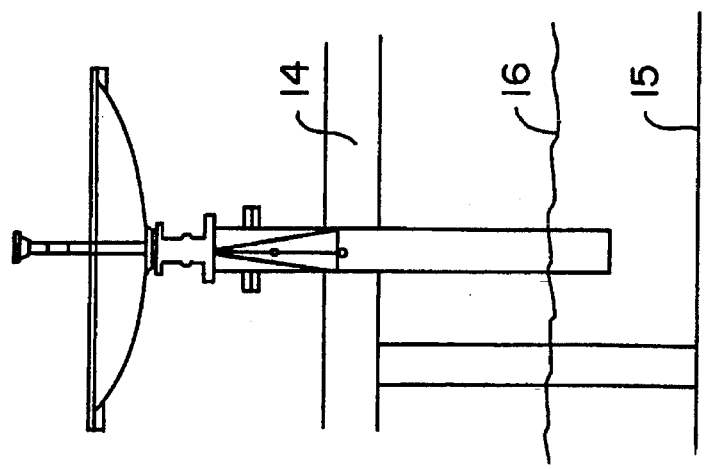
FIG. 3 is an illustration of the level gauging system using radar in floating roof tanks when the legs of the floating roof rest upon the bottom surface of the container.

FIG. 3 illustrates the continuation of the wave guide down into the fluid or oil in the floating roof when the legs of the floating roof rest on the bottom of the tank. The ends of the pipe should close over or extend to the bottom of the tank 15 when the roof 14 is in its lowest position. The continuation of the pipe below the floating roof will allow for measurements of the oil level 16 when the oil is lower than the floating roof and when the floating roof stands on or is supported by its legs.

Figure 4:
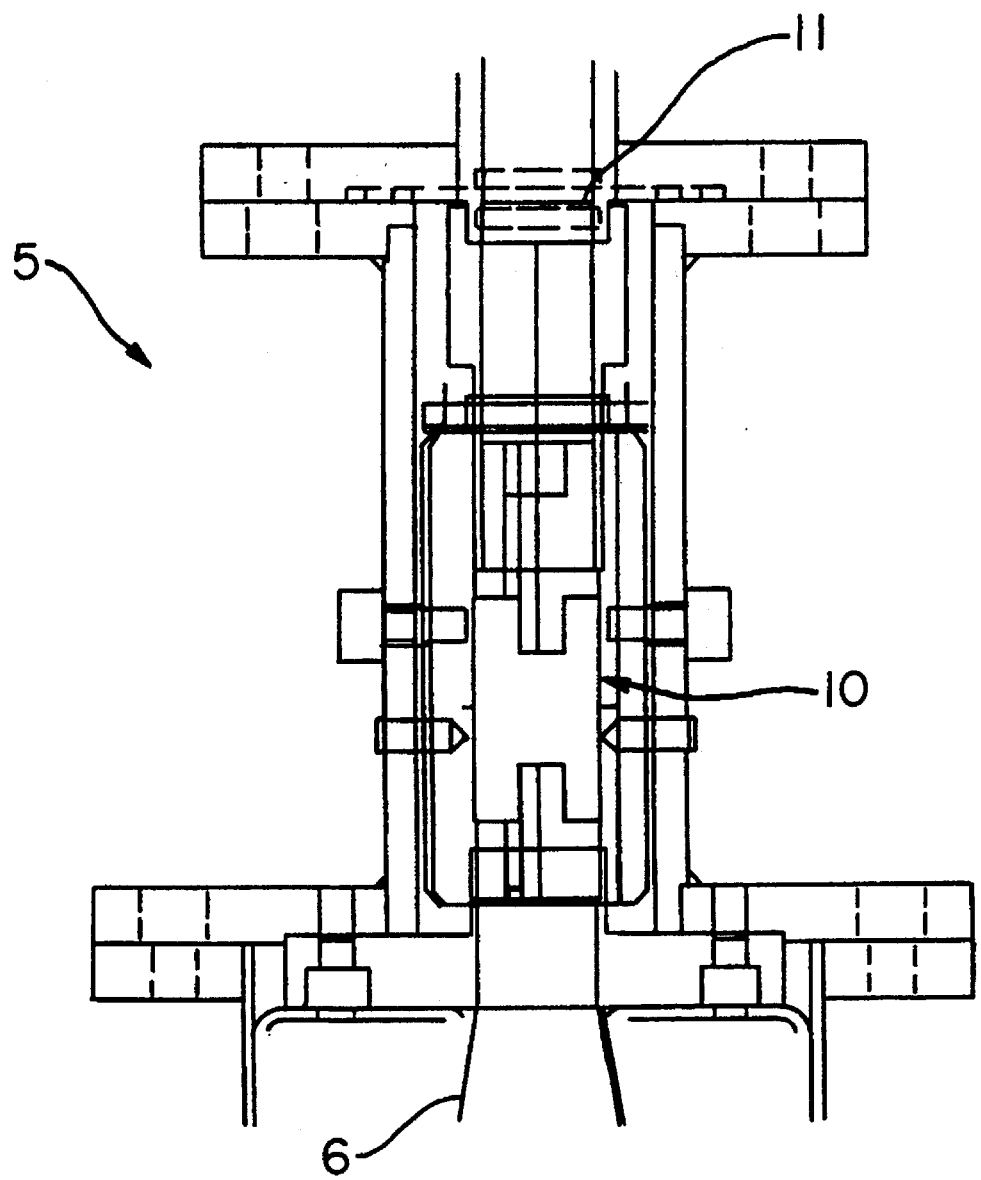
FIG. 4 is an illustration of the wave guide with polarizing means in the level gauging system using radar in floating roof tanks.

FIG. 4 is an illustration of the wave guide with polarizing means in the level gauging system using radar in floating roof tanks. As illustrated in FIG. 4, wave guide 5 is connected to a funnel 6 enlarging the diameter to a suitable diameter in the order of 3" to 6". Wave guide 5 includes vapor sealing 11 is a membrane made from a standard suitable polymer. Polarization means 10 comprises a dielectric plate placed coaxial with the axis of wave guide 5.

Figure 6:
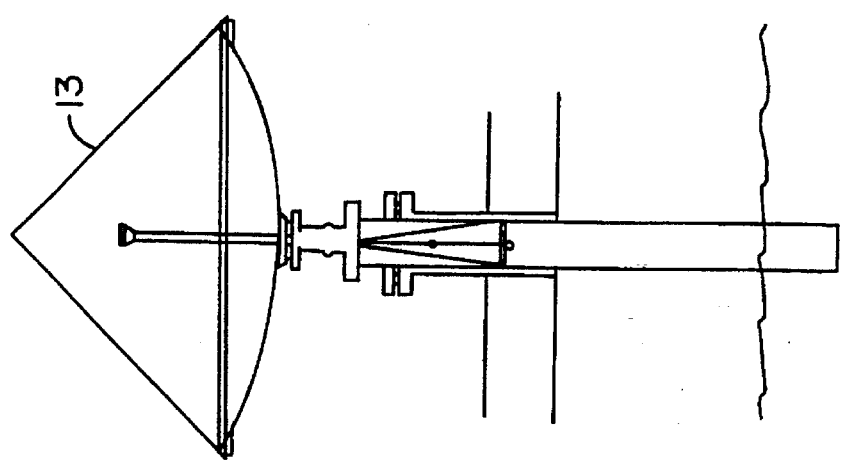
FIG. 6 is an illustration of another embodiment of the level gauging system using radar in floating roof tanks with a cone protector.
Figure 5:
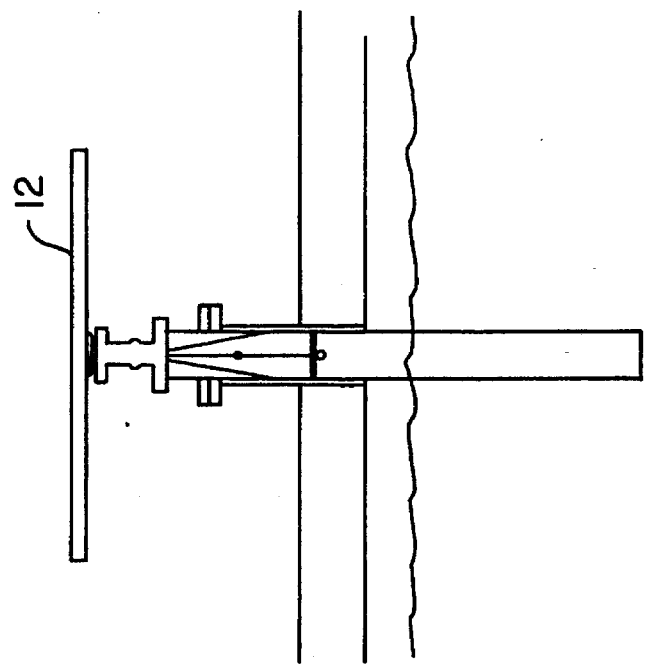
FIG. 5 is an illustration of another embodiment of the level gauging system using radar in floating roof tanks with a flat plate antenna.

Other collecting methods are obviously possible like a big flat plate antenna (array antenna) 12 illustrated in FIG. 5 or a lens which may be bulkier and heavier than the parabolic reflector. In some countries snow or cold weather may create a problem. As indicated in FIG. 6, cone 13 of a suitable plastic material may be used to simplify the sliding off of the snow otherwise collected into the parabola or on the flat plate antenna.

The important condition to be achieved or accomplished by the level gauging system is to guarantee that the fluid surface or oil echo is substantially stronger than other echoes which may be created by the floating roof and other structures or areas of the tank.

A number of methods may be used, individually or in combination, to achieve this condition:

a. The roof is partly shadowed by the rather big parabolic reflector or the corresponding collecting means.
  b. The distance from the RTG to the floating roof is smaller than the distance from the RTG to the oil surface. If the parabolic reflector solution is used, the difference in distance between the oil surface and the RTG will still be longer due to the reflections back and forth. Accordingly, the signal processing in the RTG will be able to distinguish between the floating roof echo and the fluid echo if the two echoes are not too close.

c. The remaining part of the roof which is still "visible" from the RTG can be covered by something with considerable less reflection than flat steel (for example, like corrugated steel). Another way to suppress the echo from the roof is to use the polarization means described in the next point.

d. Polarization can be used to suppress the echo from the floating roof by having the RTG send out its wave according to one linear polarization state (e.g., parallel or perpendicular to the tank wall). The RTG will then receive the reflected wave in another polarization state as described, for example, in U.S. Pat. No. 5,136,299 and copending U.S. patent application Ser. No. 08/170, 305. All reasonably symmetrical obstacles (like the roof or the tank wall) will provide only a weak reflection in "wrong" polarization state. For example, in the wave guide 5, a polarization means 10 is inserted in this case to convert the linear polarization to circular polarization which passes down to the oil. One well known method to do this conversion from linear to circular polarization is a plastic sheet in the wave guide, creating an approximately 90° phase shift in the polarization direction parallel to the plastic sheet, as compared to the perpendicular polarization. A typical virtue of a circularly polarized radar waves are that they change the direction of the circular polarization when reflected by a smooth surface or symmetrical object. A logical consequence is that the resulting reflection at the parabolic reflector 2 has a linear polarization perpendicular to the polarization of the original, downgoing radar signal from the RTG. In contrast to the reflection from the roof itself, the reflection from the oil surface may be matched with the polarization of the receiver, and thus received at a better and more identifiable amplitude.

If a flat plate array antenna is utilized as a collecting means, an alternative embodiment of the present invention is possible as described previously in connection with FIG. 5. By turning the polarization of the flat plate antenna to 45° as compared to the orthogonal linear transmit and receive polarizations of the microwave signal, no other polarization means is needed. This embodiment is, however, less efficient than the one with polarizing means converting the collected microwave into a circularly polarized microwave signal, since only 50% of the energy of the original microwave signal is reflected back to the RTG from the flat reflector. The flat plate antenna is assumed to be linear polarized which is the most straightforward design. Obviously, a flat plate antenna allowing for two linear polarizations can also be used in the same way as the parabola described earlier.

The embodiment comprising parabolic collecting means and the polarizing means for converting the collected microwave signal into a circularly polarized microwave signal with a first rotation mode, and for converting the microwave signal reflected from the fluid surface with a second rotation mode, to a linearly polarized microwave signal orthogonal to the first direction is thus preferred.

The total suppression of the echo from the floating roof will be on the order of 30–40 dB which will adequately distinguish the echo from the fluid surface which is typically 15 dB weaker than the unsuppressed echo from the roof. By the conversion from linear to circular polarization together with the well known property of a circularly polarized wave to reverse its direction by the reflection in a flat surface, the reflection from the oil surface will be enchanced as compared to other reflections. That is, the fluid echo will be approximately 15–25 dB greater than the echo from the roof.

It is recognized that the main demand for control of vapor emission is within rather warm areas of the world. It may however at some installation occur that snow will be a problem. As shown in FIG. 6, a conical "hat" or radome 13 may optionally be fitted on the top of the unit to allow reasonable amounts of snow to slide down without damaging the transmission.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, we do not desire to limit the invention to the exact construction and operation illustrated and described. Accordingly, all suitable modifications and equivalents may be resorted to, falling within the scope of the invention.

What is claimed is:

1. A device for gauging the level of a fluid by radar in a floating roof container comprising a floating roof, the device including a transmitter for feeding a first microwave signal downwards in the direction of a fluid surface of the fluid utilizing an antenna connected thereto, and a receiver built together with the transmitter for receiving a reflected microwave signal via the antenna, characterized by collecting means located above and and fixed to the floating roof, for collecting the first microwave signal transmitted by the transmitter via free space propagation in the floating roof container producing a collected microwave signal, a vertical wave guide passing through the floating roof and connected thereto and movable therewith for guiding the collected microwave signal to the fluid surface and for receiving a reflected microwave signal reflected from the fluid surface, and for guiding the reflected microwave signal back to the collecting means and further to the receiver, said vertical waveguide being substantially shorter in length in comparison with the height of the floating roof container.

2. A device according to claim 1, characterized in that the transmitter is arranged to transmit the first microwave signal, polarized linearly in a first direction, and the receiver is arranged to receive the reflected microwave signal polarized linearly in a second direction, orthogonal to the said first direction.

3. A device according to claim 2, further comprising polarizing means for converting the collected microwave signal into a circularly polarized microwave signal with a first rotation mode, and for converting the circularly polarized microwave signal reflected from the fluid surface with a second rotation mode into a linearly polarized microwave signal orthogonal to said first direction.

4. A device according to claim 2, characterized in that the collecting means is sensitive to a polarization of 45° from the polarization direction of the first microwave signal.

5. A device according to claim 1, wherein the floating roof includes legs preventing the floating roof from being lowered below a certain level in the floating roof container, characterized in that the vertical wave guide connected to and moveable with the floating roof is extended to reach the fluid surface also when the fluid surface is near the bottom of the floating roof container and below the floating roof when the legs of the floating roof rest on the bottom of the floating roof container.

6. A device according to claim 1, further comprising a cover disposed on said collecting means, said cover penetrable by the microwave signal and protecting the collecting means from being covered by snow, attenuating the microwave signals.

7. A device according to claim 1, characterized in that said vertical wave guide includes one of a constant and variable diameter funnel.

8. A device according to claim 1, characterized in that said vertical wave guide includes a sealing for hydrocarbon vapor within and around said vertical waveguide.

9. A device for measuring a fluid level of fluid in a floating roof container having an upper surface and a floating roof floating on the fluid, comprising:

a transmitter positioned at the upper surface of the floating roof container and transmitting a signal downwards toward the fluid via free space propagation in the floating roof container;

a collecting device located adjacent and fixed to the floating roof, for collecting the signal from said transmitter and producing a collected signal;

a vertical wave guide passing through the floating roof connected thereto and movable therewith, guiding the collected signal to the fluid, receiving a reflected signal responsive to the collected signal reflecting off of the fluid, and guiding the reflected signal back to said collecting device, said vertical waveguide being substantially shorter in length in comparison with the height of the floating roof container, and said collecting device transmitting the reflected signal to the upper surface of the floating roof container; and a receiver positioned at the upper surface of the floating roof container and receiving the reflected signal representing the fluid level of the fluid in the floating roof container.

10. A device according to claim 9, wherein said collecting device comprises one of a flat reflector and a parabolic reflector.

11. A device according to claim 9, wherein said collecting device comprises a parabolic reflector having a diameter substantially determined by the square root of the product of a distance between the parabolic reflector and said transmitter with a wavelength of the signal.

12. A device according to claim 9, wherein said collecting device substantially shields that part of the floating roof that may provide a reflection to minimize an echo of the signal reflected off the floating roof.

13. A device according to claim 9, wherein the floating roof is covered using a signal absorbing or signal scattering material to minimize an echo of the signal reflected off the floating roof.

14. A device according to claim 9,
wherein the floating roof includes supports of a first distance to support the floating roof on the bottom of the floating roof container, and
wherein said vertical wave guide extends a second distance below the floating roof substantially equal to the first distance of the supports.

15. A device according to claim 14, wherein said vertical wave guide is not required to extend an entire height of the floating roof container.

16. A method of measuring a fluid level of fluid in a container having an upper surface and a floating roof floating on the fluid, comprising the steps of:

(a) transmitting a signal downwards toward the fluid from a position near the upper surface of the container;

(b) collecting the signal at a location near the floating roof and producing a collected signal;

(c) guiding the collected signal to the fluid via a vertical wave guide passing through the floating roof with vapor sealing, (d) receiving a reflected signal responsive to the collected signal reflecting off of the fluid;

(e) transmitting the reflected signal from the location near the floating roof to the upper surface of the container; and (f) receiving the reflected signal representing the fluid level of the fluid in the container at the upper surface.

17. A device according to claim 1, characterized in that said vertical waveguide is about 10% of the height of the floating roof container.

18. A device according to claim 9, wherein said vertical waveguide is about 10% of the height of the floating roof container.

19. In a floating roof container having a floating roof, a gauging system including a first transmitter transmitting a first signal downwards in the direction of a fluid surface of a fluid, and a first receiver receiving a reflected signal, the gauging system measuring the level of a fluid in the floating roof container comprising:

a second receiver located on the floating roof, and receiving the first signal transmitted by the first transmitter via free space propagation in the floating roof container producing a received signal;

a wave guide passing through the floating roof, connected thereto and movable therewith, said wave guide guiding the received signal to the fluid surface and guiding the received signal reflected from the fluid surface as the reflected signal; and a second transmitter transmitting the reflected signal for reception by the first receiver, said wave guide being substantially shorter in length in comparison with the height of the floating roof container.

20. A gauging system according to claim 19, wherein said waveguide is about 10% of the height of the floating roof container.

21. In a floating roof container having a floating roof, a gauging system including a transmitter transmitting a first signal downwards in the direction of a fluid surface of a fluid, and a receiver receiving a reflected signal, the gauging system measuring the level of a fluid in the floating roof container, comprising:

a transmitter/receiver located on the floating roof, and receiving the first signal transmitted by the transmitter via free space propagation in the floating roof container producing a received signal; and a wave guide passing through the floating roof, connected thereto and movable therewith, said wave guide guiding the received signal to the fluid surface and guiding the received signal reflected from the fluid surface as the reflected signal, wherein said transmitter/receiver transmitting the reflected signal for reception by the receiver, said wave guide being substantially shorter in length in comparison with the height of the floating roof container.

22. A gauging system according to claim 21, wherein said waveguide is about 10% of the height of the floating roof container.

23. A method of measuring a fluid level of fluid in a container having an upper surface and a floating roof floating on the fluid, comprising the steps of:

(a) transmitting a signal in free space propagation in the container downwards toward the fluid from a position near the upper surface of the container;

(b) collecting the signal at a location near the floating roof and producing a collected signal;

(c) guiding the collected signal to the fluid via a vertical wave guide passing through the floating roof, connected thereto and including vapor sealing therebetween, the wave guide being substantially shorter in length in comparison with the height of the container, (d) receiving a reflected signal responsive to the collected signal reflecting reflected from the fluid;

(e) transmitting the reflected signal from the location near the floating roof to the upper surface of the container; and (f) receiving the reflected signal representing the fluid level of the fluid in the container at the upper surface.

* * * * *